United States Patent [19]

Vasbinder

[11] Patent Number: 5,398,542

[45] Date of Patent: Mar. 21, 1995

[54] METHOD FOR DETERMINING DIRECTION OF TRAVEL OF A WAVE FRONT AND APPARATUS THEREFOR

[75] Inventor: James E. Vasbinder, San Jose, Calif.

[73] Assignees: NKK Corporation, Japan; Digital Dynamics, Inc.; H. L. Ledeen Associates, both of Calif.

[21] Appl. No.: 962,526

[22] Filed: Oct. 16, 1992

[51] Int. Cl.$^6$ .............................................. G01M 3/28
[52] U.S. Cl. ................... 73/40.5 A; 73/49.1; 73/49.5
[58] Field of Search ............... 73/40, 40.5 R, 37, 49.1, 73/49.5, 592, 40.5 A

[56] References Cited

U.S. PATENT DOCUMENTS

| | | |
|---|---|---|
| 3,851,521 | 12/1974 | Ottenstein . |
| 3,903,729 | 9/1975 | Covington . |
| 3,952,759 | 4/1976 | Ottenstein ..................... 73/40.5 R |
| 4,012,944 | 3/1977 | Covington et al. . |
| 4,091,658 | 5/1978 | Covington et al. . |
| 4,144,743 | 3/1979 | Covington et al. . |
| 4,796,466 | 1/1989 | Farmer . |

FOREIGN PATENT DOCUMENTS

0042212A1 12/1981 European Pat. Off. .

OTHER PUBLICATIONS

Brochure titled "Introducing the Pressure Watch", published Jun., 1989.
"Line Break Detection and Testing Method", Y. S. Chan, a paper presented Oct. 16–17, 1980 at Pipeline Simulation Interest Group (PSIG).
"Wavealert, a new technological breakthrough that detects a pipeline leak sooner rather than later", 1980.
"Pipeline leak detection techniques" by N. C. Butler, pp. 24–29 in Journal of Pipes & Pipelines International, vol. 27, No. 2, Apr. 1982.

Primary Examiner—Hezron E. Williams
Assistant Examiner—Rose M. Finley
Attorney, Agent, or Firm—Frishauf, Holtz, Goodman & Woodward

[57] ABSTRACT

Direction of travel from a wave front in a pipeline is determined with two pressure sensors spaced relatively near to each other so that the site from which the wave front emanated is not located therebetween. For each sensor, a determination is made as to whether a detected signal has exceeded a negative or a positive threshold. In addition, the sensor outputs are subtracted from each other to determine which sensor detected the wave front first. Combining the resulting signals yields information on the nature of the wave front and its direction of travel.

45 Claims, 2 Drawing Sheets

METHOD FOR DETERMINING DIRECTION OF TRAVEL OF A WAVE FRONT AND APPARATUS THEREFOR

RELATED APPLICATIONS

"Method for Determining Arrival and Amplitude of a Wave Front and Apparatus Therefor, U.S. Ser. No. 07/962,524 filed concurrently herewith, and "Method for Locating a Pressure Transient Source in a Pipeline and Apparatus Therefor", U.S. Ser. No. 07/962,457 filed concurrently herewith.

BACKGROUND OF THE INVENTION

The present invention relates to a method and an apparatus for detecting a wave front caused by the onset of leaks or other transient events in a pipeline and, more particularly, for making use of pressure measurements of a fluid in the pipeline to determine the direction from which the wave front emanates.

It has been long known that most pipeline operational events such as operation of valves, start-up or shut-down of pumps, or a break in the pipeline can result in a sudden pressure change at the location of the event. This pressure transient immediately forms a pressure wave which travels both up-stream and down-stream from the site of the event at the speed of sound in the fluid flowing in the pipeline.

Various techniques exist for detecting the occurrence of a transient event, such as the onset of a pipeline leak. Sensors are placed at spaced locations along the pipeline to detect changes in pressure. See, for example, U.S. Pat. Nos. 4,012,944, 4,091,658 and 4,144,743 issued to Covington, and 4,796,466 issued to Farmer. Techniques are also known for determining the location of the leak from the time of arrival of the wave front at two sensors (see U.S. Pat. No. 3,851,521) and/or the amplitude of the wave front (see EPO published application no. 0 042 212). The sensors must have the site of the event located between them to yield a meaningful result with such prior art techniques.

It would be useful to determine the direction of the site of an event by a technique which does not require it to occur between two sensors. For example, a pump may be at the extreme end of a pipeline. Since such a pump has a sensor on only one side, the above-mentioned prior art techniques cannot be used to, for example, provide confirmation of its operation. Also, it may be desirable to monitor only a part of a pipeline with sensors. See, for example, related application U.S. Ser. No. 07/962,743. If an event occurs at a site remote from the monitored pipeline section, such techniques could not work properly.

Techniques are known for processing pipeline pressure signals from two sensors which do not have the site of an event located between them. The technique is used for desensitizing a monitoring system to signals coming from outside a pipeline section monitored by sensors. For example, the WAVEALERT system utilized two sensors the outputs of which were provided to a subtractor. The sensor at the extreme end of the monitored section, such as one closest to a pump, has its output connected to the subtractor via a delay circuit. The delay was set equal to the time required for a wave front to travel between the two sensors. Thus, a wave front from the direction of the pump would be cancelled out by the subtractor. On the other hand, a wave front arriving at the sensor from the monitored pipeline section would be detected by the system. U.S. Pat. No. 3,903,729 issued to Covington discloses a number of variations on this theme. However, all of these approaches merely cancel out a signal from the one direction, whereas a signal from the other direction is detected. These prior art techniques are not capable of yielding information on the site of an event regardless of which direction the wave front is coming from.

SUMMARY OF THE INVENTION

An object of the present invention is to detect a pressure transient wave front travelling in the high noise environment which is characteristic of pipelines and to determine its direction of travel in the pipeline.

This and other objects of the invention are attained in accordance with one aspect of the invention by measuring a characteristic related to fluid pressure at two positions along the pipeline. Arrival of a wave front is detected based on a difference in pressure between the two positions, and the polarity of such difference is obtained. A first arrival position is identified from between these two positions at which the wave front arrives earlier than at the other position. The travel direction of the wave front is determined from the polarity of such difference and the first arrival position.

Another aspect of the present invention is directed to a method for determining a travel direction of a pressure wave front traveling through fluid in a pipeline by, upon arrival of a wave front, converting measurements of a characteristic related to fluid pressure made at each of two positions along a pipeline to a signal indicative of a wave front arrival. A determination is made of the polarity of a difference between measurements of the characteristic related to fluid pressure taken at such two positions during an interval from a time when the wave front arrival is detected at one of these two positions where the wave front arrives earlier than at the other position and the time of arrival of the wave front at the other of these two positions. The travel direction of the wave front is identified based on the polarity difference and on the signal indicative of wave front arrival determined based on fluid pressure measurements made prior to arrival of the wave front at the other of the two positions.

The present invention has yet another aspect directed to a method for determining a type of pressure wave front and a travel direction thereof through fluid in a pipeline by measuring a characteristic related to fluid pressure at two positions along the pipeline, and determining with respect to each of such two positions whether and which of a first set of a positive and a negative threshold is exceeded by a signal derived from such measurement. An output is generated as a result of such determination which is indicative of a wave front arrival. A determination is made whether and which of a second set of a positive and a negative threshold is exceeded by a signal representative of a difference between pressure measurements made at these two positions, and as a result of such determination an indication output is generated. The travel direction of the wave front is identified along with whether the wave front is a positive-going type or a negative-going type based on the outputs of the above-described two determinations.

A further aspect of the present invention is directed to an apparatus for determining a travel direction of a pressure wave front traveling through fluid in a pipeline with means for measuring a characteristic related to fluid pressure at two positions along the pipeline, means for detecting arrival of a wave front based on a difference in pressure between the two positions and for obtaining the polarity of such difference, means for identifying a first arrival position from between these two positions at which the wave front arrives earlier than at the other position, and means for determining the travel direction of the wave front from the polarity of the difference and the first arrival position.

A still further aspect of the present invention is directed to apparatus for determining a travel direction of a pressure wave front traveling through fluid in a pipeline with means for, upon arrival of a wave front, converting measurements of a characteristic related to fluid pressure made at each of two positions along a pipeline to a signal indicative of a wave front arrival, means for determining the polarity of a difference between measurements of the characteristic related to fluid pressure taken at the two positions during an interval from a time when the wave front arrival is detected at one of the two positions where the wave front arrives earlier than at the other position and the time of arrival of the wave front at the other of the two positions, and means for identifying the travel direction of the wave front based on the polarity difference and on the signal indicative of wave front arrival determined based on fluid pressure measurements made prior to arrival of the wave front at the other of the two positions.

Another aspect of the present invention is directed to apparatus for determining a type of pressure wave front and a travel direction thereof through fluid in a pipeline with means for measuring a characteristic related to fluid pressure at two positions along the pipeline, means for determining with respect to each of the two positions whether and which of a first set of a positive and a negative threshold is exceeded by a signal derived from the measurement, and generating as a result of such determination an output indicative of a wave front arrival, means for determining whether and which of a positive and a negative threshold is exceeded by a signal representative of a difference between pressure measurements made at the two positions, and generating as a result of such determination an indication output, and means for identifying the travel direction of the wave front and whether the wave front is a positive-going type or a negative-going type based on the outputs of the two determining means.

The present invention has an additional aspect involving an apparatus for determining a travel direction of a pressure wave travelling through fluid in a pipeline, comprising two spaced transducers positioned on a pipeline and being responsive to pressure changes in the pipeline fluid. A differentiator is coupled to one of the transducers, to provide a rate of change signal. A subtractor has its inputs coupled to outputs of the transducers. A first comparator has its inputs coupled to a first threshold signal and the differentiator. A second comparator has its inputs coupled to a second threshold signal and an output of the subtractor, and a means is provided for combining outputs of the first and second comparators to provide an output indicative of the travel direction of the pressure wave.

Yet another aspect of the present invention involves an apparatus for determining a travel direction of a pressure wave travelling through fluid in a pipeline with two spaced transducers positioned on a pipeline and being responsive to pressure changes in the pipeline fluid. Two differentiators are respectively coupled to the transducers to provide a rate of change signal. A first means is provided for providing negative and positive thresholds. A first set of two comparators are both coupled to the output of one of the differentiators, and both are respectively coupled to the negative and positive thresholds of the first means. A second set of two comparators are both coupled to the output of the other differentiator, and both are respectively coupled to the negative and positive thresholds of the first means. A subtractor has its inputs coupled to the outputs of the transducers. A second means is provided for providing negative and positive thresholds. A third set of two comparators are both coupled to the output of the subtractor, and both are respectively coupled to the negative and positive thresholds of the second means. A means is provided for combining the outputs of the first, second and third sets of comparators to provide an output indicative of the travel direction of the pressure wave.

The above object as well as other objects and advantages of the present invention will become apparent from the following detailed description, taken in conjunction with the appended drawings.

BRIEF DESCRIPTIONS OF THE DRAWINGS

DETAILED DESCRIPTION OF THE INVENTION

Figure 1:
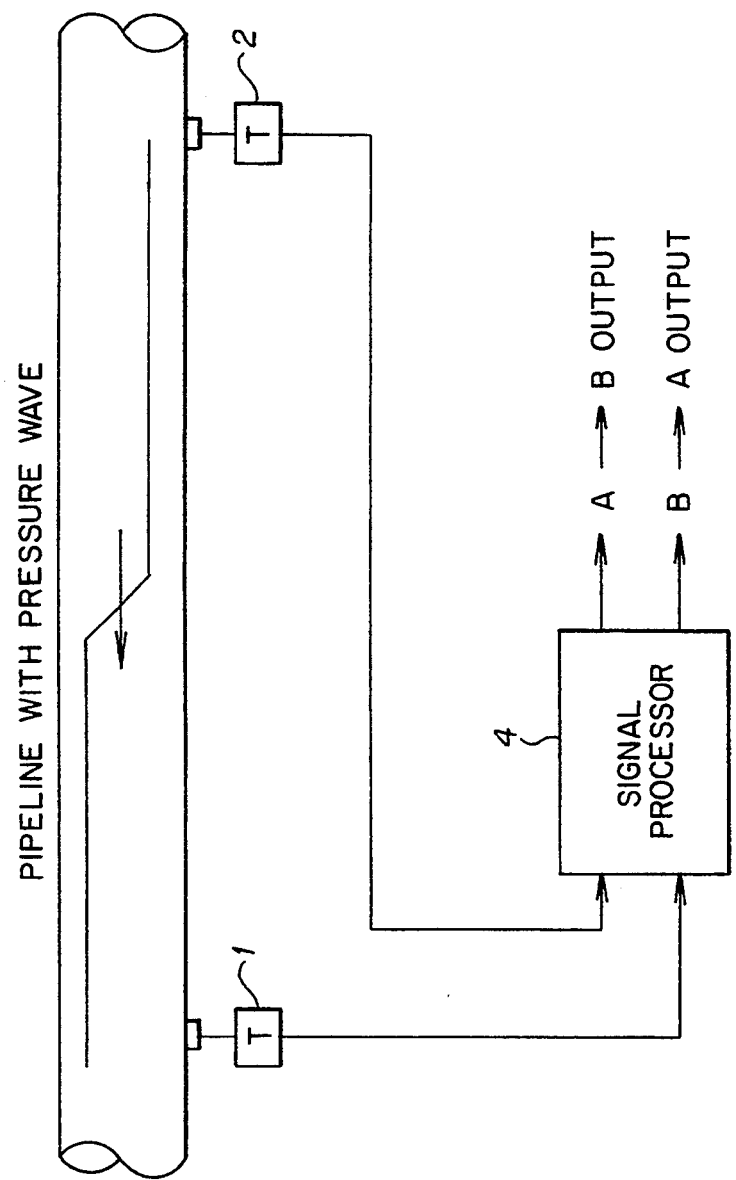
FIG. 1 is an overall block diagram of the preferred embodiment.

As shown in FIG. 1, transducers (1,2) are installed on a pipeline (3) so as to convert the internal fluid pressure to analog electrical signals. These are usually pressure transducers, but they could be strain gauges measuring pipe wall deflection, microphones, or any other sensor capable of responding to pressure transients. In the preferred embodiment, they are high quality industrial pressure transducers with a range high enough to handle the maximum pipeline pressure plus noise, and having a resolution high enough to resolve the smallest wave amplitude of concern at the longest distance desired, as affected by damping in the pipeline. Their frequency response must also be wide enough to accurately measure the shape of the transient wave. For example, on a commercial gasoline pipeline, a zero to 2000 psi transducer with at least 0.03 psi resolution and a frequency response of at least 50 Hz would be suitable for detecting 0.1 psi transients.

The spacing between the taps depends on several considerations including the pipeline noise characteristics, and is further discussed below.

In the following discussion, the time required for the wave front to pass through the fluid from one transducer to the other is called $T_{tap}$.

The transducer output signals contain considerable noise due to turbulence in the fluid and some instrument noise. There may also be a large signal offset due to the static part of the pipeline pressure. These pressure signal components interfere with the detection of wave fronts and determination of their direction, and should be reduced as much as possible by filtering. The filter parameters depend on the noise characteristics, but a passband of approximately 0.1 Hz to 50 Hz would be typical. The electrical signals from transducers 1,2 are fed to a signal processor 4 where the noise filters and the wave front detection and direction determining capabilities are implemented.

The signal processor can be designed using either analog or digital techniques. The description below applies primarily to a version utilizing analog circuitry, but it can be readily changed to a digital circuit implementation. Also, a software implementation is a readily obtainable implementation. The required modifications in this respect are well known, and details thereof are not deemed necessary.

Figure 2:
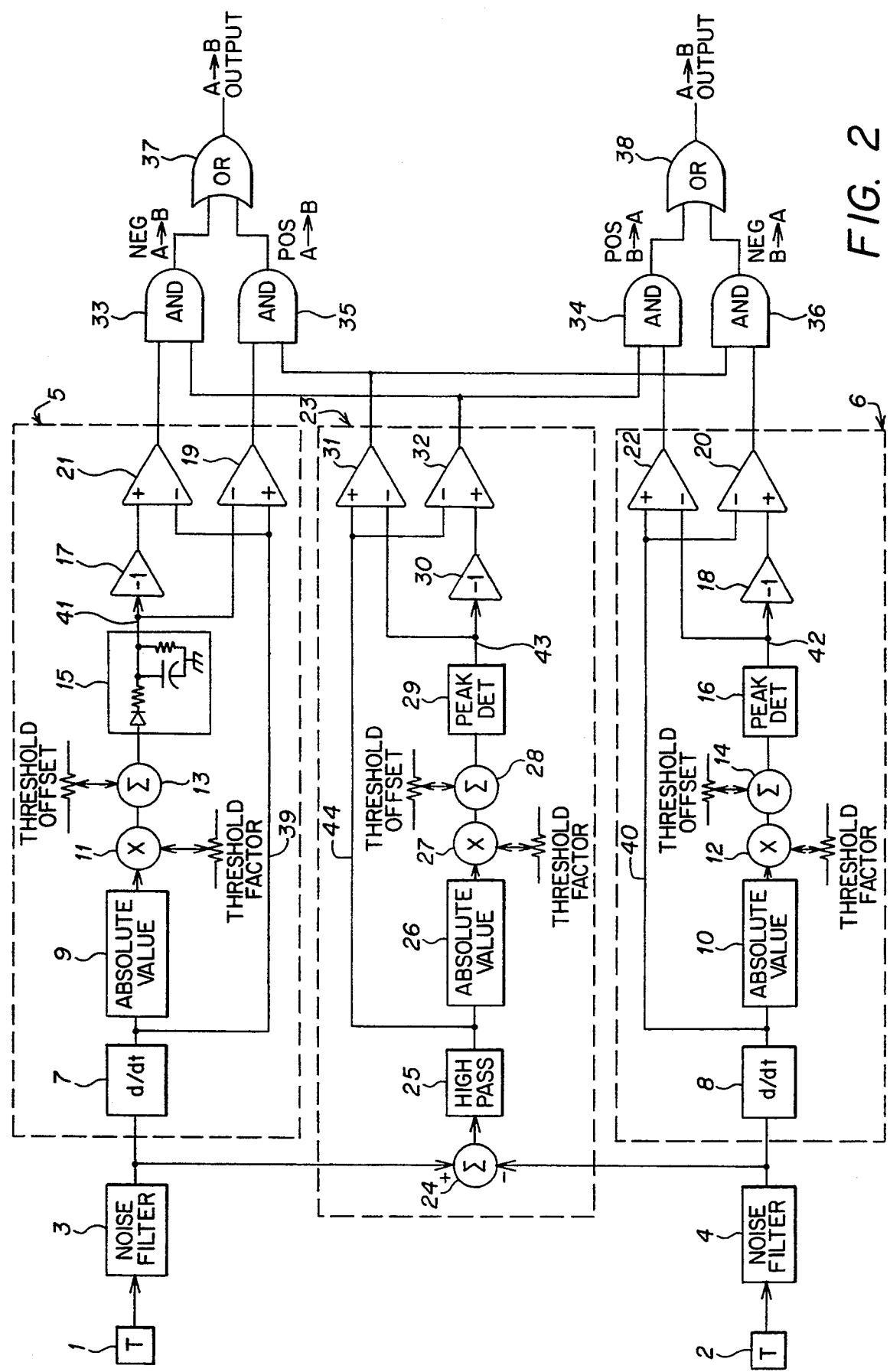
FIG. 2 is a block diagram of the signal processor.

Referring to FIG. 2, the output signals from transducers 1,2 are first passed through a set of noise filters 3,4. These are low-pass filters with a cutoff frequency of approximately 50 Hz, although this can vary depending on the pipeline noise characteristics and the tap spacing.

After each transducer signal has been filtered, it is fed to a rate of change detection circuits 5,6 and to the difference detection circuit 23. The rate of change detection circuits first differentiate the signals with differentiators 7,8, and then compare the result to respective pairs of thresholds (set as described below), one being positive and the other one negative. A rate of change exceeding the thresholds may indicate the arrival of a wave front, as further explained below.

For maximum sensitivity the thresholds should be set as close to zero as possible. However, the noise environment in the pipeline changes with time as well as with the installation site. It is, therefore, desirable to make the thresholds dependent on the signals themselves. To do this, the signals are first passed through absolute value circuits 9,10, so that all negative excursions become positive, and then through peak detectors 15,16 which output the value of the largest recent input signal peak. Peak detector (15) is shown to be an RC circuit. Its component values are selected to have a relatively short time constant in order to effect this operation, such as $T_{tap}$ for charging and 1.0 sec. for discharging. Peak detector 16 is the same as peak detector 15.

The absolute value signals are multiplied with multipliers 11,12 by a threshold factor greater than one. A threshold factor of approximately 1.2 has been found to be effective, although other values may be preferred depending on the specific conditions involved. This feature is provided because it maintains the positive and negative thresholds outside the range of "routine" noise peaks. In addition, threshold offsets can be added with adders 13,14 to provide a minimum threshold value for those instances which may occur when there is an absence of any input noise. The threshold offset needs only to be quite small, and approximately 1% of the full scale of the absolute value signal has been found to be effective.

The outputs of differentiators 7,8, which represent the rate of change, and the outputs 41,42 of the peak detectors 15,16, which are the positive thresholds, are applied to comparators 19,22 so that an output signal is generated when the rate of change is more positive than the positive threshold. Similarly, the peak detector outputs are inverted by inverters 17,18 to form negative thresholds, which are applied to another set of comparators 20,21 along with the rate of change signal. Comparators 20,21 generate an output signal when the rate of change is more negative than the corresponding negative threshold.

The threshold factor and offset, and the time constants of the differentiator and peak detector are adjusted so that, when a wave front passes, the output signal from the comparator persists for a time of approximately $T_{tap}$. This relation of the duration to $T_{tap}$ has been found to provide a signal which is better immune to noise. If the signal duration is too short, it is harder to distinguish the wave front from noise that manages to trigger the comparators. If the duration is too long, the effect of one peak (possibly noise) can mask another (possibly a real event).

Each of the filtered transducer signals is also applied to difference detection circuit 23 where they are first subtracted by subtractor 24, and then passed through a high-pass filter 25 to remove static pressure and other low-frequency components. Filter 25 has a low end cutoff frequency of 0.1 Hz. The resulting difference signal is applied to an absolute value circuit 26. A threshold factor and a threshold offset are used in a like manner as described above for rate of change detection circuits 5,6. The threshold factor provided to multiplier 27 can be approximately 1.3, and the threshold offset provided to adder 28 can be the same as in the rate of change detection circuits 5,6. The peak detector 29, inverter 30 and the two comparators 31,32 are the same as those described above for rate of change detection circuits 5,6.

The outputs of the comparators 19, 20, 21, 22 are then logically combined by AND gates 33, 34, 35, 36 and OR gates 37,38 to generate the "A to B" and "B to A" output signals indicative of direction, as described below.

In operation, it is assumed that a negative pressure transient is travelling through the fluid in the pipe so that it first reaches transducer 1, and then ($T_{tap}$ seconds later) transducer 2. Prior to the arrival of the wave front, the peak detectors 15,16,29 will have established thresholds which are slightly outside the normal range of the pressure noise, and none of the comparator output signals will be active.

When the wave front reaches transducer 1, its reading will show a sudden drop, but the reading of transducer 2 will not as yet be affected. The sudden drop will cause the rate of change signal line 39 in circuit 5 to fall below its negative threshold, and comparator 21 will generate an output. At essentially the same time, the sudden change in the difference between the signals of transducers 1,2 will cause comparator 32 in the difference detection circuit 23 to also detect a negative excursion. The outputs of comparators 21 and 32 are combined by AND gate 33 to generate a signal identifying travel of a negative wave in the "A to B" direction (i.e. from transducer 1 to transducer 2).

When the transient reaches transducer 2, its output signal too will suddenly drop. This will not affect the output of rate of change detection circuit 5 at comparator 21, the output of which will continue until peak detector 15 responds to the transient and moves the threshold beyond the output of the differentiator 7, which will also be decaying with time. However, the difference signal at the output of subtractor 24 will drop to near zero as the outputs of transducers 1 and 2 become nearly equal to each other. This will turn off comparator 32 and, therefore, AND gate 33 will cause the "A to B" output signal to cease.

The drop in the transducer 2 signal will also generate an output from comparator 20, but this will not generate a "B to A" signal from AND gate 36 since no difference output from comparator 31 will be present simultaneously.

Passage of a positive transient in the same direction will also generate an "A to B" signal from AND gate 35 via comparator 19 in rate of change detection circuit 5 and comparator 31 in the difference detection circuit sensor 23.

Arrival of a wave front in the opposite direction is analogous to the above, except that the outputs of the rate of change detection circuit 6 occur first and overlap the output of difference detection circuit 23, and that the difference signal from subtractor 24 is of the opposite polarity.

Note that the difference detection circuit 23 outputs the same signal for a negative wave travelling from A to B as for a positive wave travelling from B to A (i.e. from the transducer 2 to transducer 1). The converse is also true. The outputs of rate of change detection circuits 5,6 are the same regardless of the travel direction of the wave front, except that they occur at slightly different times. It is, therefore, necessary to AND the rate of change detection circuit outputs with the outputs of difference detection circuit 23 to obtain a legitimate direction signal.

The OR gates 37,38 in the output logic are used to combine the signals representing positive and negative waves travelling in the same direction. If this is not desired they can be omitted. In fact, if only positive or only negative transients are of interest, the absolute value function and one comparator and AND function can be eliminated from each rate of change detection circuit. If only one direction is of interest, one entire rate of change detection circuit can be eliminated.

The proper adjustment of the filters and time constants in the direction detector is dependent on the spacing of the transducer taps along the pipeline. The taps must be far enough apart so that the difference signal excursion while the wave front is between the taps lasts long enough to be distinguished from the noise that makes it through the filters. If the taps are too far apart, the high-pass filter, differentiator and peak detector time constants must be made very large to provide proper signal overlap, and doing so does not effectively remove low frequency noise. Our experience has shown that the most effective tap spacing corresponds to $T_{tap}$ values between 10 and 100 milliseconds. This would represent a range of 10 to 100 meters on a gasoline pipeline.

In a simple installation, the detection of the wave front arrival time could be used directly to sound an alarm, with the direction signals aiding in the location of the source of the wave. A more sophisticated application would involve transmitting the arrival time and direction information from each of several sites on the pipeline to a central station, where an operator or master computer could use this information to determine the location of a leak or other event, and reject waves caused by other transient sources needed to, for example, carry out normal pipeline operations.

More specifically, monitoring sites based on the herein described invention could be located at some convenient places on the pipeline, miles from a valve which is to be monitored. Each time the valve is commanded to operate, a pressure transient of the appropriate polarity, direction, and arrival time could be detected by this invention, and a simple logical comparison with the valve commands could be made to confirm its correct operation.

The above are just a few of many examples of how the time and direction of wave front arrival, once extracted from a noisy pipeline pressure signal, can be used in a variety of critically important applications.

Although details of the preferred embodiment have been discussed above, various modifications thereto are readily apparent to one with ordinary skill in the art. For example, in some situations, the system noise causes erratic output signals when the wave front amplitude is low or when a long travel distance has caused heavy dispersion in its frequency components. It has been found that the best countermeasure is not an alteration in the input noise filters, or a change in one of the many time constants or internal adjustments described above. Instead, some filtering is added to the digital comparator output signals. This has the effect of delaying the leading edge of the signal until whether it is "real" can be ascertained, and then extending the trailing edge until it has definitely ended. This filtering can be placed anywhere between the comparator outputs and the final output of the circuit. These and all other such changes are intended to fall within the scope of the present invention as defined by the following claims.

I claim:

1. A method for determining a travel direction of a pressure wave front traveling through fluid in a pipeline, comprising the steps of:
   measuring a characteristic related to fluid pressure to obtain an indication of fluid pressure at two positions along the pipeline;
   detecting arrival of a wave front, for both negative and positive wave fronts, based on a difference in the fluid pressure between said two positions, and obtaining the polarity of the pressure difference;
   identifying one of said two positions as a first arrival position, and identifying the other of said two positions as said first arrival position, depending on whether said wave front arrives earlier at said one or at said other of the two positions; and
   determining the travel direction of said wave front from the polarity of said pressure difference and said first arrival position.

2. The method of claim 1, wherein said step of detecting the arrival of a wave front includes comparing the pressure difference with a threshold.

3. The method of claim 2, further comprising the step of deriving said threshold from recent values of said pressure difference.

4. The method of claim 2, further comprising the step of providing a fixed threshold having a value corresponding to slightly more than pipeline noise.

5. The method of claim 2, further comprising the step of providing a positive threshold and a negative threshold.

6. The method of claim 1, wherein the step of identifying said first arrival position includes obtaining a rate of change for the measured characteristic pressure at each at each of said two positions, and comparing the obtained rate of change with a threshold.

7. The method of claim 6, further comprising the step of deriving said threshold from recent values of said rate of change.

8. The method of claim 6, further comprising the step of providing a fixed threshold having a value corresponding to slightly more than pipeline noise.

9. The method of claim 6, further comprising the step of providing a positive threshold and a negative threshold.

10. The method of claim 1, further comprising the step of filtering static pressure and high frequency noise from said measured characteristic.

11. A method for determining a travel direction of a pressure wave front traveling through fluid in a pipeline, comprising the steps of:

upon arrival of a wave front, converting measurements of a characteristic related to fluid pressure made at each of two positions along a pipeline to a signal indicative of a wave front arrival;

determining the polarity of a difference between measurements of said characteristic, said measurements being taken at said two positions during an interval that begins when the wave front arrival is detected at one of said two positions at which the wave front arrives earlier than at the other position and ends when the time of arrival of the wave front at the other of said two positions is detected; and identifying the travel direction of said wave front based on the polarity of said difference and on said signal indicative of wave front arrival determined based on fluid pressure measurements made prior to arrival of the wave front at the other of said two positions.

12. The method of claim 11, wherein said converting step comprises obtaining a rate of change for the measured characteristic, and comparing the obtained rate of change with a threshold.

13. The method of claim 12, further comprising the step of deriving said threshold from recent values of said rate of change.

14. The method of claim 12, further comprising the step of providing a fixed threshold having a value corresponding to slightly more than pipeline noise.

15. The method of claim 12, further comprising the step of providing a positive threshold and a negative threshold.

16. The method of claim 11, further comprising the step of filtering static pressure and high frequency noise from said measured characteristic.

17. The method of claim 11, further comprising the step of deriving a value of the difference between measurements of said characteristic taken at said two locations, and enabling said identifying step only if said difference value exceeds a threshold.

18. The method of claim 17, further comprising the step of deriving said threshold from recent values of said pressure difference.

19. The method of claim 17, further comprising the step of providing a fixed threshold having a value corresponding to slightly more than pipeline noise.

20. The method of claim 17, further comprising the step of providing a positive threshold and a negative threshold.

21. A method for determining a type of pressure wave front and a travel direction thereof through fluid in a pipeline, comprising the steps of:

(a) measuring a characteristic related to fluid pressure to obtain an indication of fluid pressure at two positions along the pipeline;

(b) determining with respect to each of said two positions whether and which of a first set of a positive and a negative threshold is exceeded by a signal derived from said measured characteristic;

(c) generating as a result of determining step (b) an output indicative of a wave front arrival;

(d) determining whether and which of a second set of a positive and a negative threshold is exceeded by a signal representative of a difference between signals derived from said characteristic measured at said two positions, (e) generating as a result of determining step (d) an indication output; and (f) identifying the travel direction of the wave front and whether said wave front is a positive-going type or a negative-going type based on the outputs of steps (b) and (d).

22. The method of claim 21, further comprising the step of providing said first set of positive and negative thresholds.

23. The method of claim 22, wherein said signal derived from said measurement is a rate of change.

24. The method of claim 23, further comprising the step of obtaining said first set of thresholds from recent values of said rate of change.

25. The method of claim 23, further comprising the step of providing a fixed threshold for said first set of thresholds having a value corresponding to slightly more than pipeline noise.

26. The method of claim 22, further comprising the step of filtering static pressure and high frequency noise from said measured characteristic.

27. The method of claim 21, further comprising the step of providing said second set of positive and negative thresholds.

28. The method of claim 27, further comprising the step of obtaining said second set of thresholds from recent values of said pressure difference.

29. The method of claim 27, further comprising the step of providing for said second set of thresholds a fixed threshold having a value corresponding to slightly more than pipeline noise.

30. An apparatus for determining a travel direction of a pressure wave front traveling through fluid in a pipeline, comprising:

means for measuring a characteristic related to fluid pressure to obtain an indication of fluid pressure at two positions along the pipeline;

means for detecting arrival of a wave front, for both negative and positive wave fronts, based on a difference in the fluid pressure between said two positions, and obtaining the polarity of the pressure difference;

means for identifying one of said two positions as a first arrival position, and identifying the other of said two positions as said first arrival position, depending on whether said wave front arrives earlier at said one or at said other of the two positions; and means for determining the travel direction of said wave front from the polarity of said pressure difference and said first arrival position.

31. The apparatus of claim 30, wherein said detecting means includes means for comparing the pressure difference with a threshold.

32. The apparatus of claim 30, wherein said identifying means includes means for obtaining a rate of change for the measured characteristic at each of said two positions, and comparing the obtained rate of change with a threshold.

33. An apparatus for determining a travel direction of a pressure wave front traveling through fluid in a pipeline, comprising:

means for, upon arrival of a wave front, converting measurements of a characteristic related to fluid pressure made at each of two positions along a pipeline to a signal indicative of a wave front arrival;

means for determining the polarity of a difference between measurements of said characteristic, said measurements being taken at said two positions during an interval that begins when the wave front arrival is detected at one of said two positions at which the wave front arrives earlier than at the other position and ends when the time of arrival of the wave front at the other of said two positions is detected; and means for identifying the travel direction of said wave front based on the polarity of said difference and on said signal indicative of wave front arrival determined based on fluid pressure measurements made prior to arrival of the wave front at the other of said two positions.

34. The apparatus of claim 33, wherein said converting means comprises means for obtaining a rate of change for the measured characteristic, and comparing the obtained rate of change with a threshold.

35. The apparatus of claim 33, further comprising means for deriving a value of the difference between measurements of said characteristic taken at said two locations, and enabling said identifying means only if said difference value exceeds a threshold.

36. An apparatus for determining a type of pressure wave front and a travel direction thereof through fluid in a pipeline, comprising:

means for measuring a characteristic related to fluid pressure at two positions along the pipeline;

first means for determining with respect to each of said two positions whether and which of a first set of a positive and a negative threshold is exceeded by a signal derived from said measured characteristic;

means for generating from a result provided by said first determining means an output indicative of a wave front arrival;

second means for determining whether and which of a positive and a negative threshold is exceeded by a signal representative of a difference between signals derived from said characteristic measured at said two positions means for generating from a result provided by said second determining means an indication output; and means for identifying the travel direction of the wave front and whether said wave front is a positive-going type or a negative-going type based on the outputs of the first and second determining means.

37. The apparatus of claim 36, further comprising means for providing said first set of positive and negative thresholds.

38. The apparatus of claim 37, further comprising means for providing a fixed threshold for said first set of thresholds having a value corresponding to slightly more than pipeline noise.

39. The apparatus of claim 36, further comprising means for providing said second set of positive and negative thresholds.

40. An apparatus for determining a travel direction of a pressure wave travelling through fluid in a pipeline, comprising:

two spaced transducers positioned on a pipeline and being responsive to pressure in the pipeline fluid;

a differentiator coupled to one of said transducers, to provide a rate of change signal;

a subtractor having inputs coupled to outputs of said transducers;

a first comparator having inputs coupled to a first threshold signal and said differentiator;

a second comparator having inputs coupled to a second threshold signal and an output of said subtractor; and means for combining outputs of said first and second comparators to provide an output indicative of the travel direction of the pressure wave.

41. The apparatus of claim 40, further comprising a filter coupled to said differentiator for providing said first threshold signal.

42. The apparatus of claim 41, further comprising an absolute value circuit between said differentiator and said filter.

43. The apparatus of claim 41, wherein the characteristics of said filter are related to the spacing between said transducers.

44. The apparatus of claim 41, wherein said filter is a peak detector, and having characteristics that are set to output noise peaks.

45. An apparatus for determining a travel direction of a pressure wave travelling through fluid in a pipeline, comprising:

two spaced transducers positioned on a pipeline and being responsive to pressure in the pipeline fluid;

two differentiators respectively coupled to said transducers to provide a rate of change signal;

first means for providing negative and positive thresholds;

a first set of two comparators, both being coupled to the output of one of said differentiators, and both being respectively coupled to said negative and positive thresholds of said first means;

a second set of two comparators, both being coupled to the output of said other differentiator, and both being respectively coupled to said negative and positive thresholds of said first means;

a subtractor having inputs coupled to the outputs of said transducers;

a second means for providing negative and positive thresholds;

a third set of two comparators, both being coupled to the output of said subtractor, and both being respectively coupled to said negative and positive thresholds of said second means; and means for combining the outputs of said first, second and third sets of comparators to provide an output indicative of the travel direction of the pressure wave.

* * * * *

UNITED STATES PATENT AND TRADEMARK OFFICE
CERTIFICATE OF CORRECTION

PATENT NO. : 5,398,542
DATED : March 21, 1995
INVENTOR(S) : Vasbinder

It is certified that error appears in the above-indentified patent and that said Letters Patent is hereby corrected as shown below:

Column 1, line 51, "07/962,743" should be --07/962,457--

Column 8, lines 54 and 55 (claim 6),
        delete "pressure at each"

Signed and Sealed this

Sixth Day of August, 1996

Attest:

BRUCE LEHMAN

Attesting Officer      Commissioner of Patents and Trademarks